(12) United States Patent
Gilbert-Eyres et al.

(10) Patent No.: US 12,312,107 B2
(45) Date of Patent: May 27, 2025

(54) SYSTEM AND METHOD FOR ASSISTING A TRAILERING VEHICLE

(71) Applicant: GM GLOBAL TECHNOLOGY OPERATIONS LLC, Detroit, MI (US)

(72) Inventors: Matthew E. Gilbert-Eyres, Rochester Hills, MI (US); Adam L. Wright, Livonia, MI (US); Russell A. Patenaude, Macomb Township, MI (US); Eric T. Hosey, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 18/324,196

(22) Filed: May 26, 2023

(65) Prior Publication Data

US 2024/0391615 A1 Nov. 28, 2024

(51) Int. Cl.
*B64U 70/93* (2023.01)
*B64C 39/02* (2023.01)
*B64U 101/30* (2023.01)

(52) U.S. Cl.
CPC ............. *B64U 70/93* (2023.01); *B64C 39/02* (2013.01); *B64U 2101/30* (2023.01); *B64U 2201/20* (2023.01)

(58) Field of Classification Search
CPC ............. B64U 70/93; B64U 2101/30; B64U 2201/20; B64U 80/86; B64C 39/02
See application file for complete search history.

(56) References Cited

U.S. PATENT DOCUMENTS

| | | | |
|---|---|---|---|
| 2016/0173740 A1* | 6/2016 | Corby | H04N 23/60 |
| | | | 348/148 |
| 2017/0032175 A1* | 2/2017 | Lee | B64U 10/14 |
| 2019/0066503 A1* | 2/2019 | Li | G05D 1/0094 |
| 2020/0216196 A1* | 7/2020 | Sohmshetty | B64F 3/00 |
| 2022/0392672 A1* | 12/2022 | Getman | B64U 50/31 |
| 2023/0278732 A1* | 9/2023 | Nordkvist | B66C 13/06 |
| | | | 244/75.1 |

* cited by examiner

Primary Examiner — Harry Y Oh
(74) Attorney, Agent, or Firm — Quinn IP Law

(57) ABSTRACT

A system for assisting a vehicle having a trailer includes a drone having at least one sensor adapted to collect sensor data. The drone is selectively attachable to the vehicle. A controller is in communication with the drone. The controller is adapted to selectively execute an assessment mode, an operational mode, and a delivery mode, the operational mode being executed after the assessment mode is completed. The drone is adapted to conduct a set of initial checks during the assessment mode, the drone being adapted to fly around the trailer and/or the vehicle during the assessment mode. The drone is attached to the vehicle during the operational mode. The delivery mode is executed upon arrival of the vehicle at a predefined destination, the drone being adapted to be in flight during the delivery mode.

18 Claims, 6 Drawing Sheets

SYSTEM AND METHOD FOR ASSISTING A TRAILERING VEHICLE

INTRODUCTION

The present disclosure relates generally to assistance of a vehicle having a trailer. More specifically, the disclosure relates to a system and method for assisting a vehicle with a drone. It is an undeniable facet of modern life that many people spend a considerable amount of time in their vehicles, while being transported from one place to another. Many vehicles carry loads during their journey. For example, the load may include boats, recreational vehicles, skiing equipment, construction equipment, machinery, and other items. However, trailering may be a challenging task due to various factors. For example, the load may be heavy, bulky, and the view of a driver around the trailer may not be clear.

SUMMARY

Disclosed herein is a system for assisting a vehicle having a trailer. The system includes a drone having at least one sensor adapted to collect sensor data. The drone is selectively attachable to the vehicle. A controller is in communication with the drone, the controller having a processor and tangible, non-transitory memory on which instructions are recorded. The controller is adapted to selectively execute an assessment mode, an operational mode, and a delivery mode, the operational mode being executed after the assessment mode is completed. The drone is adapted to conduct a set of initial checks during the assessment mode, the drone being adapted to fly around the trailer and/or the vehicle during the assessment mode. The drone is attached to the vehicle during the operational mode. The delivery mode is executed upon arrival of the vehicle at a predefined destination, the drone being adapted to be in flight during the delivery mode.

The at least one sensor may include a camera and a radar unit. The plurality of initial checks may include checking for balance of a load weight of the trailer and checking an attachment status of the trailer to the vehicle. The plurality of initial checks may include checking a respective working status of at least one turn signal on the trailer and at least one brake light on the trailer. The plurality of initial checks may include obtaining respective measurements of the trailer and/or the vehicle. The respective results of the plurality of initial checks are transmitted to a remote advisory unit for compilation of a trailering report.

In some embodiments, the drone is adapted to attach to a roof of the vehicle during the operational mode. Execution of the operational mode includes checking a respective status of a drone view, the drone view being remotely adjustable based on user input. In some embodiments, the drone includes at least one telescoping extension adapted to adjust a position of the drone and a drone view. The telescoping extension may be employed to adjust the position of the drone when the drone view is obstructed. The operational mode may include transmission of an alert when a concerning situation is detected, based in part on the sensor data.

The delivery mode is based in part on a delivery type. The delivery type may be based on user input. The delivery type may include at least one of the following: a boat launch, a regular offloading, and a delivery into an enclosed space. In one embodiment, the at least one sensor includes a LiDAR unit, and the delivery type is a boat launch. Here, the delivery mode includes determining a depth of water the boat is being launched into, the depth being determined based in part on the sensor data.

Disclosed herein is a method of assisting a vehicle with a drone in communication with a controller having a processor and tangible, non-transitory memory on which instructions are recorded, the vehicle having a trailer. The method includes incorporating at least one sensor in the drone for collecting sensor data, the drone being selectively attachable to the vehicle. The method includes selectively executing an assessment mode, an operational mode, and a delivery mode, via the controller, the operational mode being executed after the assessment mode is completed. The method includes conducting a plurality of initial checks during the assessment mode, via the drone, the drone being adapted to fly around the trailer and/or the vehicle during the assessment mode. The drone is attached to the vehicle during the operational mode. The method includes executing the delivery mode upon arrival of the vehicle at a predefined destination, the drone being adapted to be in flight during the delivery mode.

The above features and advantages and other features and advantages of the present disclosure are readily apparent from the following detailed description of the best modes for carrying out the disclosure when taken in connection with the accompanying drawings.

Figure 1:
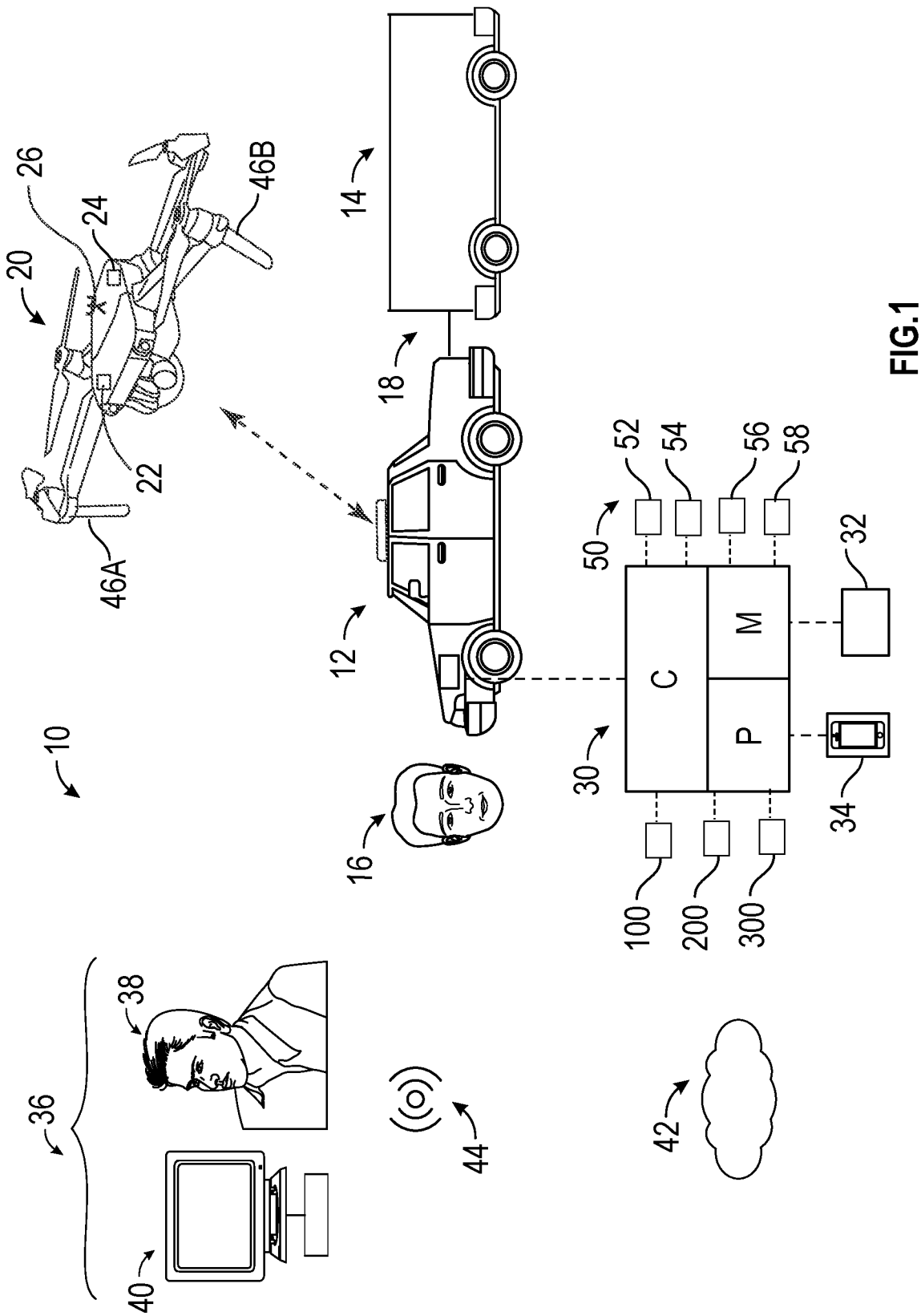
FIG. 1 is a schematic fragmentary diagram of a system for assisting a vehicle having a trailer, the system having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
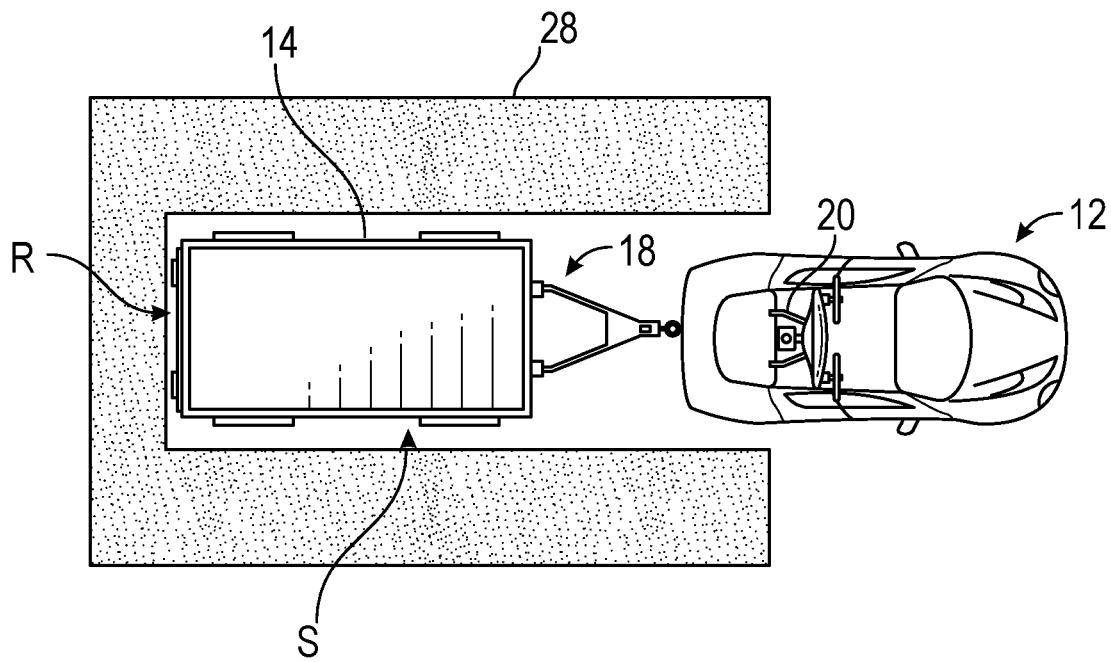
FIG. 2 is a schematic fragmentary top view of an example vehicle with a trailer of FIG. 1.

Referring to the drawings, wherein like reference numbers refer to like components, FIGS. 1-2 schematically illustrate a system 10 for assisting a vehicle 12 having a trailer 14. The vehicle 12 may be occupied by a user 16, shown in FIG. 1. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train, or another moving platform. The vehicle 12 may be an electric vehicle, which may be purely electric or partially electric. It is to be understood that the vehicle 12 may take many different forms and have additional components.

Referring to FIGS. 1-2, the trailer 14 may be attached to the vehicle 12 using an attachment 18 available to those skilled in the art. The system 10 employs an unmanned aerial vehicle 20, referred to herein as drone 20, to assist with the trailering activity from the time of loading the payload or cargo to the time of delivery. The drone 20 may be in the form of a balloon, blimp, kite, or other unmanned aerial device capable of operating in the manner described herein.

Figure 3:
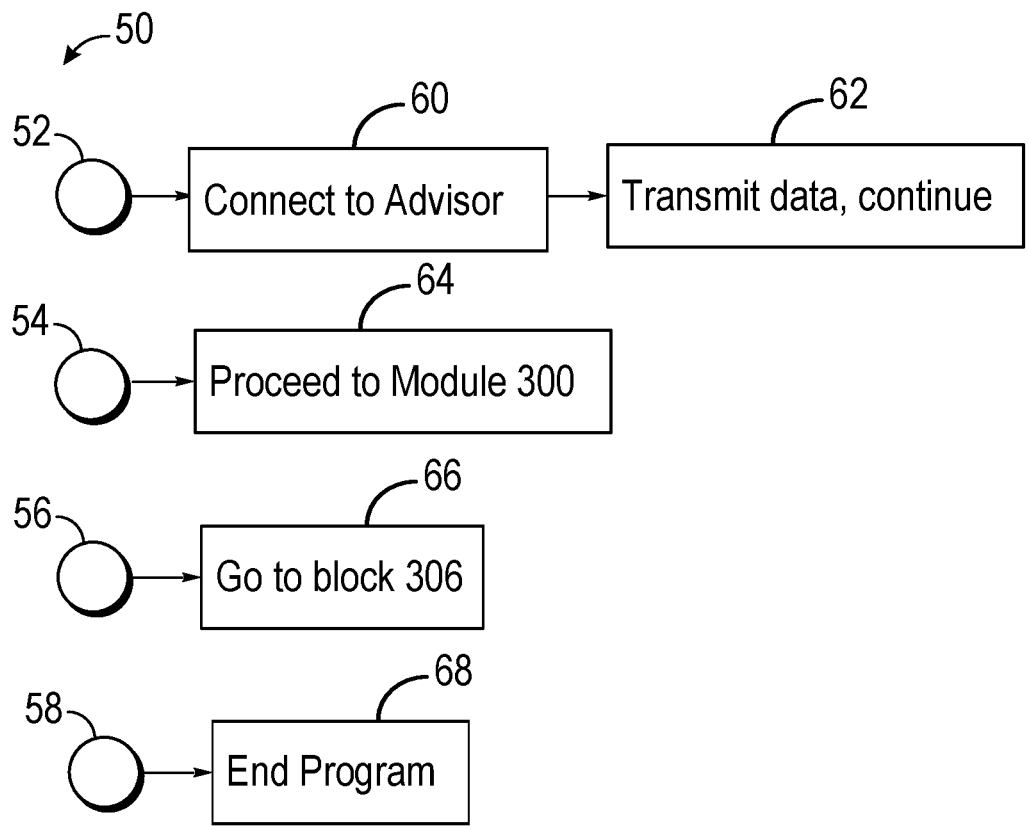
FIG. 3 is a schematic diagram of a plurality of interrupt buttons available to a user of the vehicle.

Referring to FIG. 1, the drone 20 is equipped with one or more sensors 22, which may include a camera and a radar unit. The drone obtains sensor data both flying around the trailer 14 and vehicle 12, as well as being attached onto the vehicle 12. The drone 20 is adapted to take pictures of the trailer 14 and the ground. In some embodiments, the sensors 22 include a LiDAR unit. The sensors 22 may include other detection devices available to those skilled in the art. The drone 20 includes a drone controller 24 adapted to collect information from the sensors 22 onboard the drone 20. The drone 20 includes an antenna 26 for communications. An example field of view of the drone 20, referred to herein as drone view 28, is shown in FIG. 2. In FIG. 2, the drone 20 is attached to the vehicle 12. The drone view 28 captures the area surrounding or encapsulating the trailer 14, including the rear-view R and the side-view S of the trailer 14. As will be described below, FIG. 3 shows a plurality of interrupt buttons 50 available to the user 16 of the vehicle 12.

Referring to FIG. 1, the system 10 includes a command unit 30 having an integrated controller C with at least one processor P and at least one memory M (or non-transitory, tangible computer readable medium) on which instructions may be recorded for selectively executing one or more modes that assist the vehicle 12 with the trailer 14. The modes include an assessment mode 100, an operational mode 200, and a delivery mode 300, described below and shown in FIGS. 4, 5, and 6, respectively. It is understood that the modes 100, 200, 300 may be independently executed by the command unit 30. The memory M can store controller-executable instruction sets, and the processor P can execute the controller-executable instruction sets stored in the memory M.

As described below, the system 10 provides trailering functionality without requiring multiple built-in sensors in the vehicle 12. Referring to FIG. 1, the vehicle 12 may include a telematics unit 32 for establishing two-way communications, including receiving and transmitting sensor data. For example, the telematics unit 32 may collect telemetry data from the vehicle 12, such as location, speed, engine data, maintenance requirements and servicing, by interfacing with various internal sub-systems. The telematics unit 32 may enable vehicle-to-vehicle (V2V) communication and/or a vehicle-to-everything (V2X) communication.

Referring to FIG. 1, the vehicle 12 may include a mobile application 34 for communicating with the command unit 30. The mobile application 34 may be embedded in a smart device (e.g., smart phone) belonging to the user 16 of the vehicle 12, which may be plugged in or otherwise linked to the vehicle 12. The circuitry and components of a mobile application ("apps") available to those skilled in the art may be employed.

The system 10 offers a plug-in play functionality that turns a vehicle 12 into a trailering equipped transport. Referring to FIG. 1, the user 16 in the vehicle 12 may establish communication with a remote advisory unit 36 through the telematics unit 32. The remote advisory unit 36 may provide subscription service-based communications such as in-vehicle services, turn-by-turn navigation, tracking and other services. In one embodiment, the remote advisory unit 36 is OnStar™. The remote advisory unit 36 may be manned electronically and/or by a remote advisor 38 having access to an electronic device 40 such as a desktop computer, laptop, tablet, cell phone or wearable device. The remote advisory unit 36 may include one or more servers that each include a processing device and a memory device and at least one database that includes vehicle information.

As described below with respect to the assessment mode 100, upon loading of the trailer 14, the drone 20 is adapted to fly around the vehicle 12 and/or trailer 14 and conduct a set of initial checks. This may include checking for proper tie down and determining if the load is overhanging etc. This information may be uploaded to the remote advisory unit 36 for compilation of a trailering report. During the operational mode 200, sensor data from the drone 20 may be live streamed to the remote advisory unit 36. An alert may be transmitted to the remote advisory unit 36 when concerning issues are detected based in part on the sensor data from the drone 20.

In one embodiment, the controller C is embedded in the vehicle 12. If the vehicle 12 is part of a fleet, the controller C may be embedded in a master or leader vehicle. In another embodiment, the controller C may be hosted or based out of a remotely located cloud computing service 42. The cloud computing service 42 may include one or more remote servers hosted on the Internet to store, manage, and process data. The cloud computing service 42 may be at least partially managed by personnel at various locations.

The system 10 may employ a wireless network 44 for communications between the vehicle 12 and the command unit 30, shown in FIG. 1. The wireless network 44 may be a short-range network or a long-range network. The wireless network 44 may be a communication BUS, which may be in the form of a serial Controller Area Network (CAN-BUS). The wireless network 44 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 44 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 4:
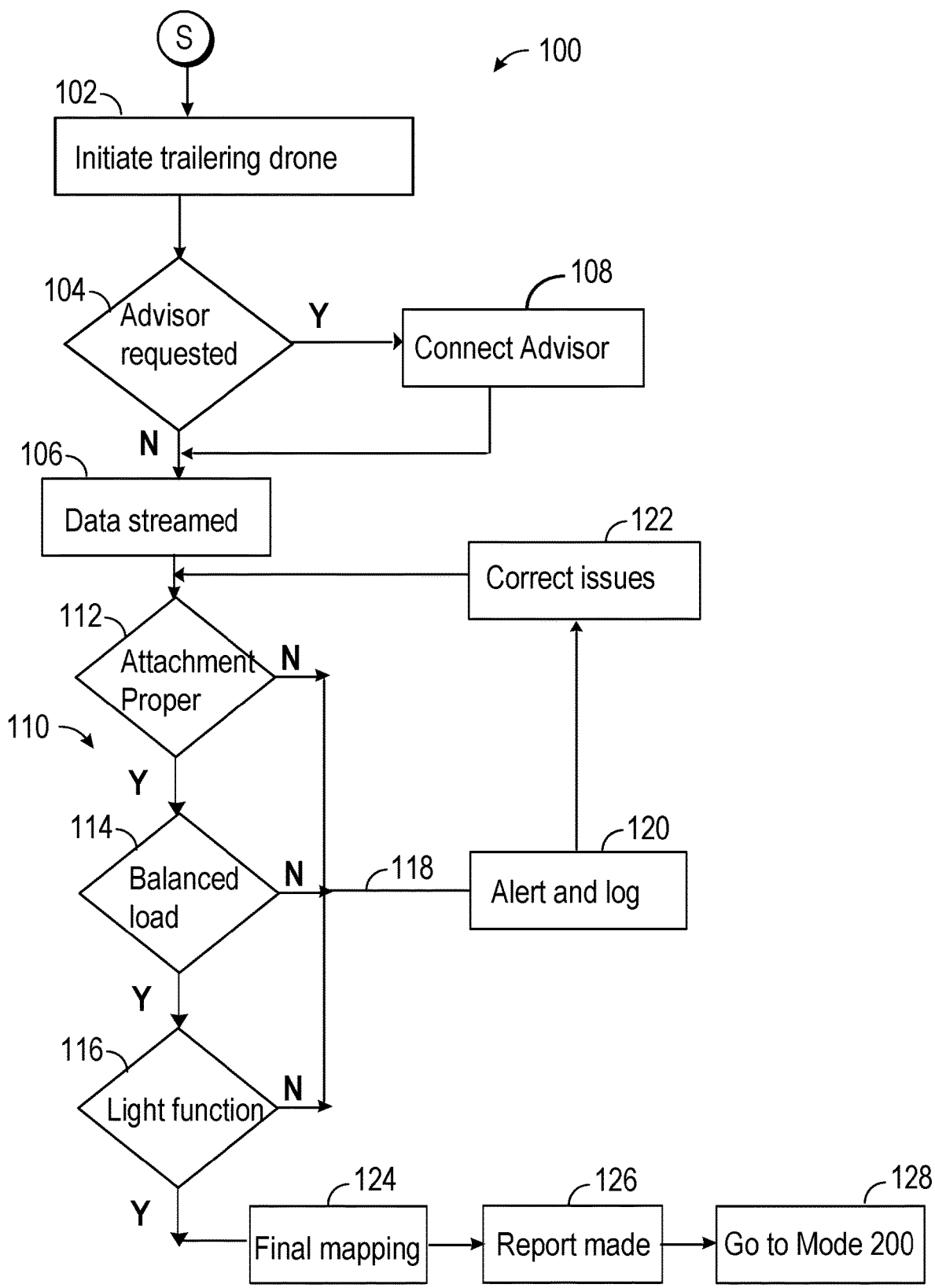
FIG. 4 is a flowchart for a first mode executable by the controller of FIG. 1.

Referring now to FIG. 4, a flowchart of an example assessment mode 100 is shown. Mode 100 may be embodied as computer-readable code or stored instructions that are at least partially executable by the command unit 30. Mode 100 need not be applied in the specific order recited herein, and it is to be understood that some blocks may be eliminated.

The mode 100 begins at block 102 where bilateral communication between the drone 20 and the vehicle 12 is initiated. In some embodiments, the drone 20 may be stored within and released from the vehicle 12 at this point. In other embodiments, the drone 20 may be brought in or flown in from a distribution center. Proceeding to block 104, the user 16 is prompted to see if they would like to connect with remote advisor 38, who may be trained to help conduct assessments using live feedback provided by the drone 20.

If no advisor is requested (block 104=NO), the mode 100 proceeds to block 106 where the live data obtained by the drone 20, including video data from the camera, is streamed to the controller C. If the advisor has been requested (block 104=YES), the advisor is connected to the vehicle (per block 108) and mode 100 proceeds to block 106.

From block 106, the mode 100 proceeds to block 110, which includes a set of initial checks, shown in this example in blocks 112, 114 and 116. Additional checks may be employed based on the application at hand. Per block 112, the sensors 22 in the drone 20 are employed to check whether the trailer 14 is attached to the vehicle 12 properly, e.g., visually identify the attachment mechanism of the trailer 14, inspect whether the trailer 14 is connected to the ball hitch and whether backup chains attached. If the attachment is proper (block 112=YES), the mode 100 proceeds to block 114.

Per block 114, the sensors 22 in the drone 20 are employed to check for load balance. For example, radar and camera technology may be used to inspect how the trailer 14 is loaded as well as checking distances from the trailer bed to the ground to determine if the load weight is balanced (i.e., left side of trailer 14 is the same distance from the ground as the right side of the trailer 14). If the load is balanced (block 114=YES), the mode 100 proceeds to block 116.

Per block 116, the sensors 22 in the drone 20 are employed to check a respective working status of at least one turn signal on the trailer 14 and at least one brake light on the trailer 14. This may be done via two-way communication with the user 16. The light check may be conducted by commanding the user 16 to turn certain signals on and off, with the drone verifying that light is detected in the correct zone for the requested action. If the trailer turn signals and brake lights are functioning properly (block 116=YES), the mode 100 proceeds to block 124.

If one of the plurality of checks is not cleared (block 112=NO or block 114=NO or block 116=NO), the mode 100 proceeds (via line 118) to block 120 where the controller C is adapted to create a log and alert the user 16 and/or the remote advisory unit 36 that an assessment check has not been cleared. Proceeding from block 120 to block 122, an attempt is made to correct the issue that has been flagged and the mode 100 is looped back to block 110 to repeat the plurality of checks.

Per block 124, final mapping of the vehicle 12 and trailer 14 may be done by the drone, including obtaining precise measurements. The mode 100 proceeds to block 126, where the measurement data and data obtained in block 110 is sent to the user 16 and/or remote advisory unit. Per block 126, the remote advisory unit may create a trailing report that is continuously updated during the trailering. The trailering report may include the results of the assessment pre-checks conducted, images of the trailer hitch and load, and other concerns during operation. Per block 128, the vehicle 12 is alerted that the preassessment is complete and that the system 10 is ready for the second mode.

Figure 5:
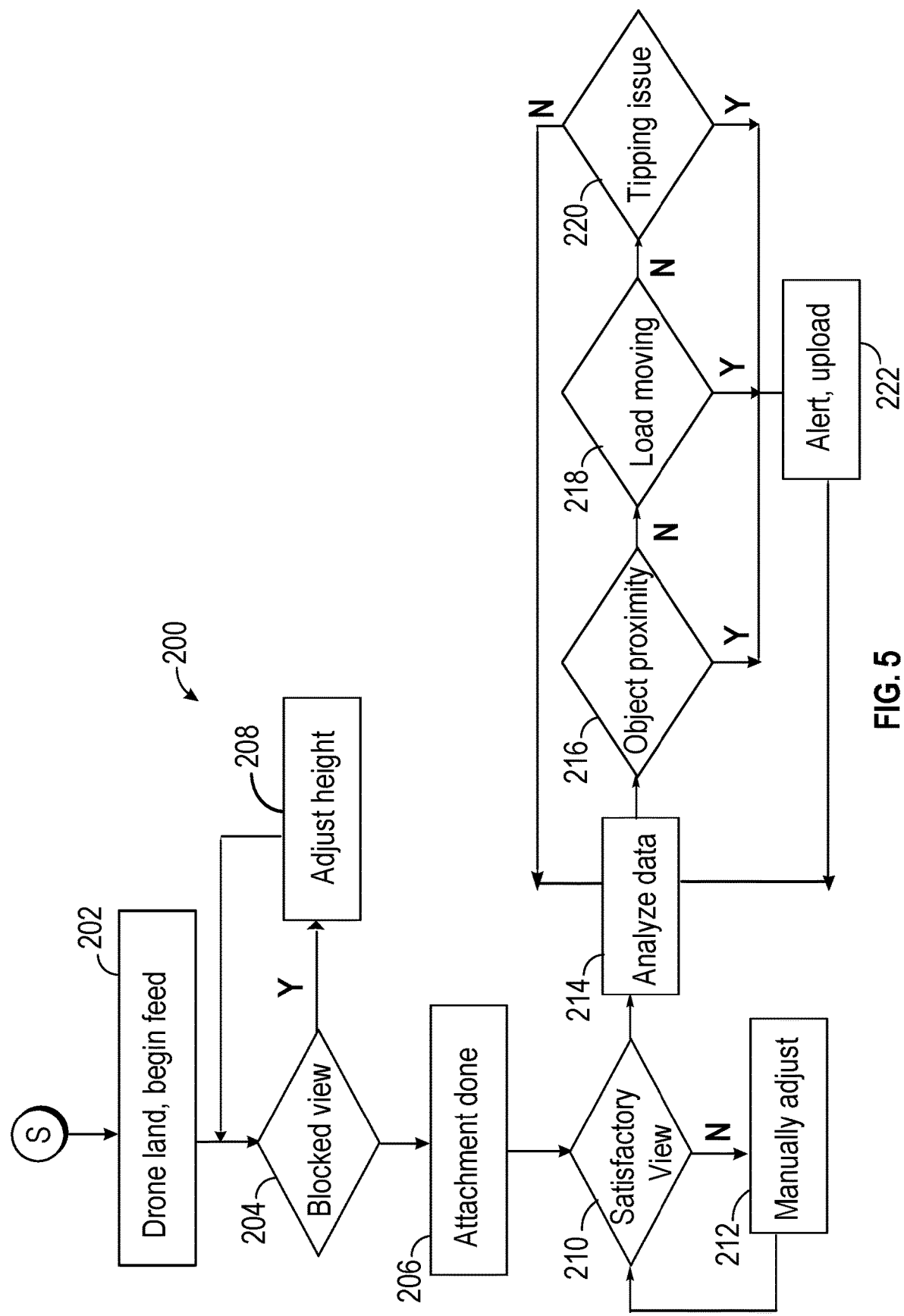
FIG. 5 is a flowchart for a second mode executable by the controller of FIG. 1.

Referring now to FIG. 5, a flowchart of an example operational mode 200 is shown. Mode 200 may be embodied as computer-readable code or stored instructions that are at least partially executable by the command unit 30. Mode 200 need not be applied in the specific order recited herein, and it is to be understood that some blocks may be eliminated.

Once the assessment mode 100 is completed, the operational mode 200 is initiated. Per block 202, the drone lands on the vehicle 12, e.g., on a panel on the roof of the vehicle 12. The drone 20 securely attaches itself to the vehicle 12 via a magnet or latching device. A live stream of video and radar information to the vehicle 12 may be initiated. From block 202, the mode 200 proceeds to block 204, where the drone determines if the drone view is obstructed. An example drone view 28 is shown in FIG. 2.

If the drone view is obstructed (block 204=YES), the mode 200 proceeds to block 208 where the drone view is adjusted to clear the obstruction and mode 200 loops back to block 204. Referring to FIG. 1, the drone 20 may include telescoping extensions, such as extendable legs 46A, 46B, that are extendable to allow the drone 20 to extend higher from the roof of the vehicle. If the drone view is unobstructed (block 204=YES), the mode 200 proceeds to block 206 where the drone 20 alerts the user 16 that the automated attach process is complete. The mode 200 proceeds to block 210 to determine if the user 16 is satisfied with the viewing angles.

If the user 16 is not satisfied (block 210=NO), the mode 200 proceeds to block 212 where the user 16 may remotely and manually adjust the sensors 22, including adjusting the camera position and angle on the drone 20. The mode 200 loops back to block 210. If the user 16 is satisfied (block 210=YES), the mode 200 proceeds to block 214. Per block 214, the vehicle 12 is now ready to drive and the live data from the drone 20 is analyzed.

From block 214, the mode 200 proceeds to block 216 where data from the sensors 22 in the drone 20 is used to determine if proximity to an object has been detected. If not (block 216=NO), the mode 200 proceeds to block to 218. Per block 218, the sensor data from the drone 20 is used to determine if the load in the trailer 14 is moving, for example, if the straps around the load are loose. If not (block 218=NO), the mode 200 proceeds to block 220. Per block 220, the sensor data from the drone 20 is used to determine if there is a jackknife or tipping rate risk, e.g., if the crank wheel is too hard. If not (block 220=NO), the mode 200 loops back to block to 214.

A set of operational checks are conducted in blocks 216, 218 and 220. If one of the operational checks is not cleared (block 216=YES or block 218=YES or block 220=YES), the mode 200 proceeds to block 222 where the remote advisory unit 36 and/or user 16 is alerted to the specific issue which has been detected. The controller C may be adapted to create a log of the event and upload the event to the cloud. The mode 200 returns to block 214 to repeat the operational checks. The mode 200 may continue in this loop until one of the plurality of interrupt buttons 50 has been requested.

Referring now to FIG. 3, a plurality of interrupt buttons 50 available to the user 16 of the vehicle 12 are shown. The plurality of interrupt buttons 50 may include an advisor requested button 52, a drone location button 54, a delivery button 56, and an end program button 58. When the advisor requested button 52 is selected, the controller C is adapted to execute block 60 and connect the user 16 to a remote advisor 38 (e.g., OnStar advisors). Next, per block 62, the control sequence or flow is returned to where the user 16 was prior to the advisor requested button 52 being selected.

Referring to FIG. 3, when the drone location button 54 is selected, per block 64, the user 16 may manually adjust the location of the drone 20 to a desired location, e.g., where there is a tricky spot that cannot be seen. The drone 20 may return to its previous location based on the input of the user 16. Referring to FIG. 3, the delivery button 56 may be utilized by the user 16 when the delivery of the load in the trailer 14 has begun. When the delivery button 56 is selected, per block 66, the control sequence or flow is shifted to block 306 (shown in FIG. 6 and described below). Referring to FIG. 3, when the end program button 58 is selected by the user 16, the control sequence is ended, per block 68.

Figure 6:
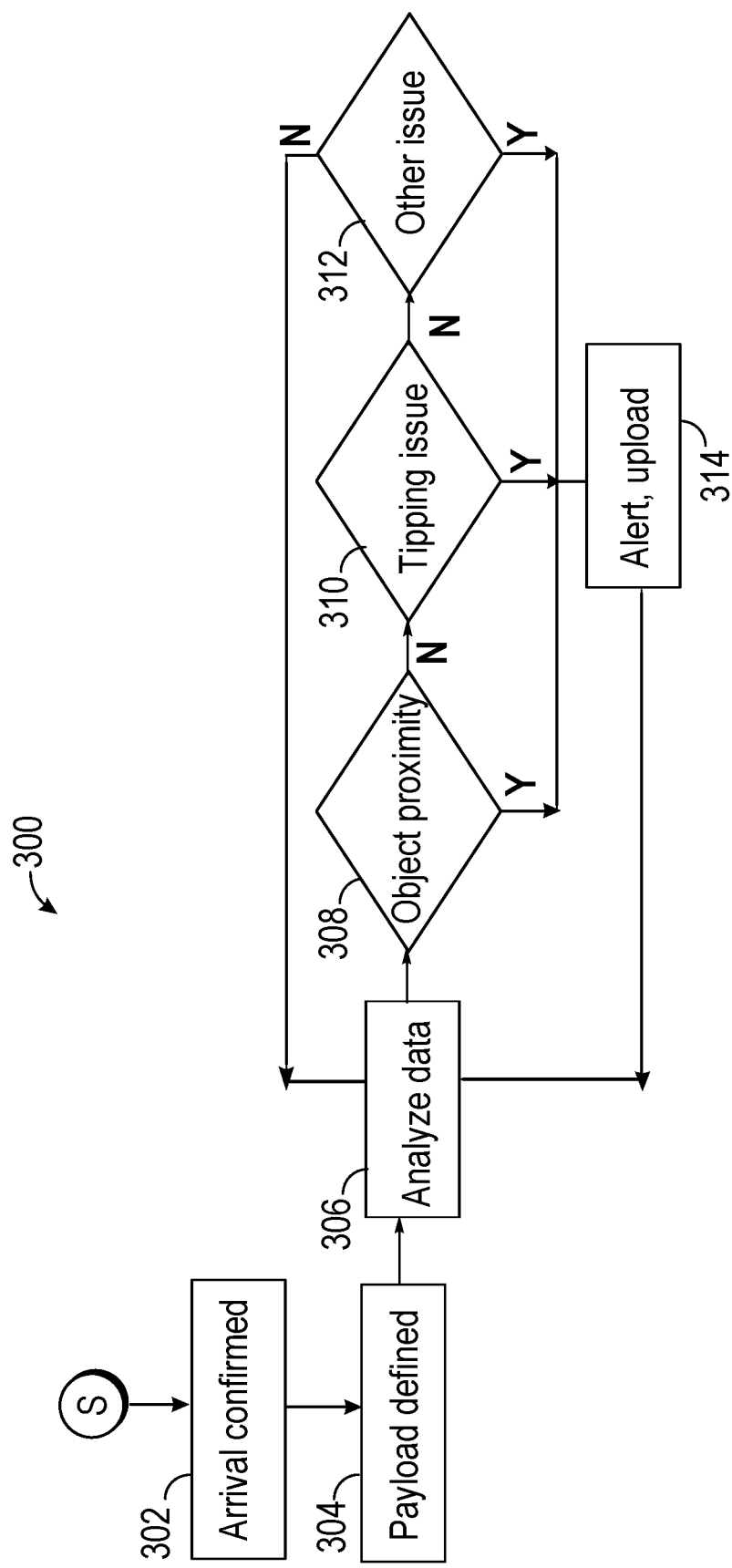
FIG. 6 is a flowchart for a third mode executable by the controller of FIG. 1.

Referring now to FIG. 6, a flowchart of an example delivery mode 300 is shown. Mode 300 may be embodied as computer-readable code or stored instructions that are at least partially executable by the command unit 30. Mode 300 need not be applied in the specific order recited herein, and it is to be understood that some blocks may be eliminated.

Beginning at block 302, the user 16 may confirm arrival at a predefined destination via an input device. The arrival may be confirmed by the remote advisor 38. Upon arrival at the predefined destination, an automatic command releases the drone 20 from the vehicle 12. The drone 20 enters into flight during the delivery mode 300, begins taking in an aerial view of the trailer 14, and collecting sensor data.

Proceeding to block 304 of FIG. 6, the user 16 designates the delivery type being performed. The delivery type may include, but is not limited to, a boat being launched into a body of water, and a regular offloading into an open space. The delivery type may include delivery of the trailer load into an enclosed space (e.g., unloading into a garage). The viewing angles of the drone 20 may be remotely adjusted based on the delivery type. In some embodiments, the sensors 22 include a LiDAR unit. For a boat launch, the drone 20 may provide live aerial views of the launch as well as provide water depth via the LiDAR unit.

Figure 7:
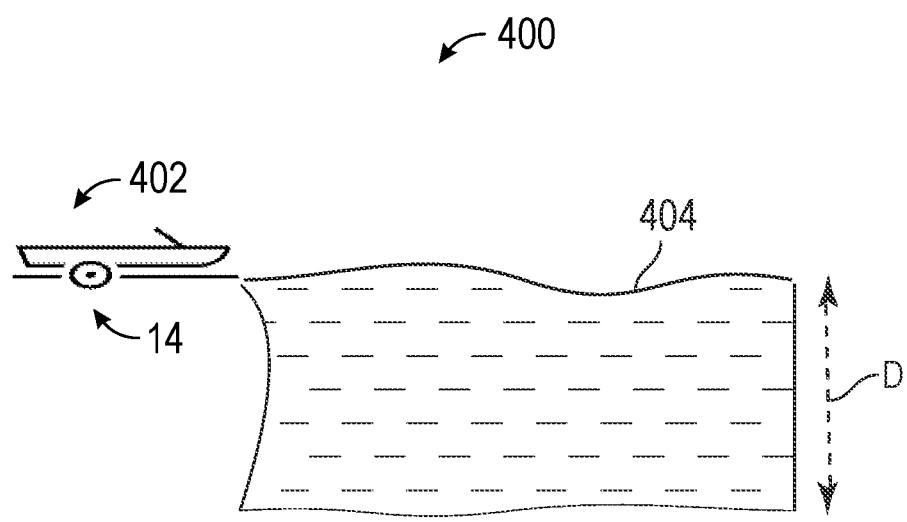
FIG. 7 is a schematic fragmentary diagram of an example delivery type implementable by the system of FIG. 1.

FIG. 7 is a schematic fragmentary diagram of an example boat launch 400 implementable by the system 10. Referring to FIG. 7, the load 402 on the trailer 14 is a boat 402 that is being launched into a body of water 404. Sensor data from the drone 20 may be used to determine the depth D that the boat 402 is being launched in.

Proceeding to block 306 from block 304 in FIG. 5, the live data from the drone 20 is analyzed. From block 306, the mode 300 proceeds to block 308 where data from the sensors 22 in the drone 20 is used to determine if proximity to an object (e.g., wall of the garage) has been detected. If not (block 308=NO), the mode 300 proceeds to block 310 where sensor data from the drone 20 is used to determine if there is a jackknife or tipping risk. If not (block 310=NO), the mode 300 proceeds to block 312 where sensor data from the drone 20 is used to determine if another concerning issue has been detected. If not (block 312=NO), the mode 300 is ended.

Referring to FIG. 6, a set of payload delivery checks are conducted in blocks 308, 310 and 312. If one of the delivery checks is not cleared (block 308=YES or block 310=YES or block 312=YES), the mode 300 proceeds to block 314 where the remote advisory unit 36 and/or user 16 is alerted to the specific issue which has been detected. The controller C may be adapted to create a log of the event and upload the event to the cloud. The mode 300 returns to block 306 to repeat the delivery checks.

In summary, the system 10 enables a set of initial checks, operational checks, and delivery checks to be conducted. The system 10 provides an effective way of using a drone 20 to enhance the trailering experience.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire, and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer may read.

Look-up tables, databases, data repositories, or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description, are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for assisting a vehicle having a trailer, the system comprising:
    a drone having at least one sensor adapted to collect sensor data, the drone being selectively attachable to the vehicle;
    a controller in communication with the drone, the controller having a processor and tangible, non-transitory memory on which instructions are recorded;
    wherein the controller is adapted to selectively execute an assessment mode, an operational mode, and a delivery mode, the operational mode being executed after the assessment mode is completed;
    wherein the drone is adapted to conduct a plurality of initial checks during the assessment mode, the drone being adapted to fly around the trailer and/or the vehicle during the assessment mode;
    wherein the plurality of initial checks includes checking a respective working status of at least one turn signal on the trailer and at least one brake light on the trailer;
    wherein the drone is attached to the vehicle during the operational mode; and
    wherein the delivery mode is executed upon arrival of the vehicle at a predefined destination, the drone being adapted to be in flight during the delivery mode.

2. The system of claim 1, wherein the at least one sensor includes a camera and a radar unit.

3. The system of claim 1, wherein the drone is adapted to attach to a roof of the vehicle during the operational mode.

4. The system of claim 1, wherein the plurality of initial checks includes checking for balance of a load weight of the trailer and checking an attachment status of the trailer to the vehicle.

5. The system of claim 1, wherein:
    the plurality of initial checks includes obtaining respective measurements of the trailer and/or the vehicle; and
    respective results of the plurality of initial checks are transmitted to a remote advisory unit for compilation of a trailering report.

6. The system of claim 1, wherein execution of the operational mode includes checking a respective status of a drone view, the drone view being remotely adjustable based on user input.

7. The system of claim 1, wherein:
    the drone includes at least one telescoping extension adapted to adjust a position of the drone and a drone view; and
    execution of the operational mode includes checking a respective status of the drone view, the at least one telescoping extension being employed to adjust the position of the drone when the drone view is obstructed.

8. The system of claim 1, wherein:
    the delivery mode is based in part on a delivery type, the delivery type being based in part on user input; and
    the delivery type includes at least one of a boat launch, a regular offloading, and a delivery into an enclosed space.

9. The system of claim 8, wherein:
    the at least one sensor includes a LiDAR unit;
    the delivery type is a boat launch; and
    delivery mode includes determining a depth of water the boat is being launched into, the depth being determined based in part on the sensor data.

10. The system of claim 1, wherein the operational mode includes transmission of an alert when a concerning situation is detected, based in part on the sensor data.

11. A method of assisting a vehicle with a drone in communication with a controller having a processor and tangible, non-transitory memory on which instructions are recorded, the vehicle having a trailer, the method comprising:
    incorporating at least one sensor in the drone for collecting sensor data, the drone being selectively attachable to the vehicle;
    executing selectively an assessment mode, an operational mode, and a delivery mode, via the controller, the operational mode being executed after the assessment mode is completed;
    conducting a plurality of initial checks during the assessment mode, including checking for balance of a load weight of the trailer and checking an attachment status of the trailer to the vehicle, via the drone, the drone being adapted to fly around the trailer and/or the vehicle during the assessment mode;
    attaching the drone to the vehicle during the operational mode; and
    executing the delivery mode upon arrival of the vehicle at a predefined destination, the drone being adapted to be in flight during the delivery mode.

12. The method of claim 11, further comprising:
    incorporating a camera and a radar unit in the at least one sensor, the drone being adapted to attach to a roof of the vehicle during the operational mode.

13. The method of claim 11, further comprising:
    incorporating in the plurality of initial checks, checking a respective working status of at least one turn signal on the trailer and at least one brake light on the trailer.

14. The method of claim 11, further comprising:
    incorporating in the plurality of initial checks, obtaining respective measurements of the vehicle and/or the trailer; and
    relaying the respective measurements to a remote advisory unit for compilation of a trailering report.

15. The method of claim 11, further comprising:
    incorporating at least one telescoping extension in the drone and adjusting a position of the drone and a drone view, via the at least one telescoping extension;
    checking a respective status of the drone view during the operational mode; and
    using the at least one telescoping extension to adjust the position of the drone when the drone view is obstructed.

16. The method of claim 11, further comprising:
executing the delivery mode based on a delivery type, the delivery type including at least one of a boat launch, a regular offloading, and a delivery into an enclosed space.

17. The method of claim 16, wherein:
the at least one sensor includes a LiDAR unit;
the delivery type is a boat launch; and
the delivery mode includes determining a depth of water the boat is being loaded into, the depth being determined based in part on the sensor data.

18. A system for assisting a vehicle having a trailer, the system comprising:
a drone having at least one sensor adapted to collect sensor data, the drone being selectively attachable to the vehicle;
a controller in communication with the drone, the controller having a processor and tangible, non-transitory memory on which instructions are recorded;
wherein the controller is adapted to selectively execute an assessment mode, an operational mode, and a delivery mode, the operational mode being executed after the assessment mode is completed;
wherein the drone is adapted to conduct a plurality of initial checks during the assessment mode, the drone being adapted to fly around the trailer and/or the vehicle during the assessment mode;
wherein the drone includes at least one telescoping extension adapted to adjust a position of the drone and a drone view, the drone being attached to the vehicle during the operational mode;
wherein execution of the operational mode includes checking a respective status of the drone view, the at least one telescoping extension being employed to adjust the position of the drone when the drone view is obstructed; and
wherein the delivery mode is executed upon arrival of the vehicle at a predefined destination, the drone being adapted to be in flight during the delivery mode.

* * * * *